US012063312B2

(12) United States Patent
Aggarwal et al.

(10) Patent No.: US 12,063,312 B2
(45) Date of Patent: Aug. 13, 2024

(54) SECURITY PROCEDURE FOR CRYPTOGRAPHIC SIGNATURE VERIFICATION BASED ON A TRUST RELATIONSHIP BETWEEN EDGE NODES CONNECTING HOME AND VISITED NETWORKS

(71) Applicant: Nokia Technologies Oy, Espoo (FI)

(72) Inventors: Chaitanya Aggarwal, Munich (DE); Saurabh Khare, Bangalore (IN); Anja Jerichow, Grafing bei München (DE); Jani Ekman, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 17/523,251

(22) Filed: Nov. 10, 2021

(65) Prior Publication Data
US 2022/0158847 A1    May 19, 2022

(30) Foreign Application Priority Data
Nov. 16, 2020    (IN) .............................. 202041049906

(51) Int. Cl.
*H04L 9/32*    (2006.01)
(52) U.S. Cl.
CPC .................................. *H04L 9/3247* (2013.01)
(58) Field of Classification Search
CPC ...................................................... H04L 9/3247
USPC ........................................................ 713/176
See application file for complete search history.

(56) References Cited

U.S. PATENT DOCUMENTS

| 2006/0274695 A1* | 12/2006 | Krishnamurthi | H04L 9/3213 |
| | | | 713/155 |
| 2018/0007537 A1* | 1/2018 | Kuc | H04W 8/183 |
| 2019/0124070 A1 | 4/2019 | Engan et al. | |
| 2019/0253894 A1* | 8/2019 | Bykampadi | H04L 67/51 |
| 2020/0052903 A1* | 2/2020 | Lam | H04L 9/3239 |
| 2021/0288802 A1* | 9/2021 | Muhanna | H04L 9/3263 |
| 2021/0385093 A1* | 12/2021 | Shaw | G06F 21/32 |
| 2022/0029822 A1* | 1/2022 | Ubbens | H04L 9/0891 |
| 2022/0095111 A1* | 3/2022 | Fu | H04L 63/0853 |

OTHER PUBLICATIONS

Extended European Search Report received for corresponding European Patent Application No. 21208364.6, dated Feb. 1, 2022, 12 pages.

(Continued)

*Primary Examiner* — Thanh T Le
(74) *Attorney, Agent, or Firm* — Barta Jones, PLLC

(57) ABSTRACT

According to an example aspect of the present invention, there is provided an apparatus configured at least to determine whether a cryptographic signature of a token received in the apparatus from a network function consumer is valid, obtain a cryptographic signature of the apparatus of the token responsive to the cryptographic signature of the token being valid, and provide the token to a peer entity of the apparatus, wherein the cryptographic signature of the apparatus is either included into the token or provided in a header external to the token, wherein the peer entity is comprised in a second network, different from a first network where the apparatus is comprised in. The request may serve a user equipment, directly or indirectly.

17 Claims, 5 Drawing Sheets

(56) References Cited

OTHER PUBLICATIONS

"3rd Generation Partnership Project; Technical Specification Group Services and System Aspects; Security Aspects; Study on security aspects of the 5G Service Based Architecture (SBA) (Release 16)", 3GPP TR 33.855, V16.1.0, Sep. 2020, pp. 1-103.

"Analysis of different approaches for implementing SBA security over N32reference point", 3GPP TSG SA WG3 (Security) Meeting #90, S3-180028, Agenda: 7.2.13.2, TIM, Jan. 22-26, 2018, 5 pages.

"3rd Generation Partnership Project; Technical Specification Group Services and System Aspects; Security architecture and procedures for 5G system (Release 16)", 3GPP TS 33.501, V16.4.0, Sep. 2020, pp. 1-250.

"Token-based authorization for indirect communication in roaming case", 3GPP TSG-SA3 Meeting #101-e, S3-203290, Ericsson, Nov. 9-20, 2020, 6 pages.

"3rd Generation Partnership Project; Technical Specification Group Services and System Aspects; Network Domain Security (NDS); Authentication Framework (AF) (Release 16)", 3GPP TS 33.310, V16.5.0, Sep. 2020, pp. 1-59.

Jones et al., "JSON Web Signature (JWS)", RFC 7515, Internet Engineering Task Force (IETF), May 2015, pp. 1-59.

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.

"3rd Generation Partnership Project; Technical Specification Group Core Network and Terminals; 5G System; Technical Realization of Service Based Architecture; Stage 3 (Release 17)", 3GPP TS 29.500, V17.0.0, Sep. 2020, pp. 1-82.

"3rd Generation Partnership Project; Technical Specification Group Services and System Aspects; Study on Enhancements to the Service-Based Architecture (Release 16)", 3GPP TR 23.742, V16.0.0, Dec. 2018, pp. 1-131.

"He-Man and the Masters of the Universe", IMDb, Retrieved on Nov. 9, 2021, Webpage available at : https://www.imdb.com/title/tt0126158/.

* cited by examiner

SECURITY PROCEDURE FOR CRYPTOGRAPHIC SIGNATURE VERIFICATION BASED ON A TRUST RELATIONSHIP BETWEEN EDGE NODES CONNECTING HOME AND VISITED NETWORKS

FIELD

The present disclosure pertains to network security procedures.

BACKGROUND

Communication networks provide communication services to users within their communication domain. For example, a public land mobile network, PLMN, may connect users with terminals registered to the PLMN by arranging communication pathways switched together to convey information between the terminals. To obtain connectivity between communicating entities registered in different networks, the networks need inter-network interfaces to convey information across their respective boundaries.

Gateways are, in general, network nodes tasked with exchanging information with entities in other networks. In other words, gateways enable networks to be connected together, such that nodes in different networks may communicate with each other. In a typical case, such an inter-network connection may traverse at least one gateway in each network along the overall communication path between the entities in the differing networks. In the case of two networks, the inter-network communication may traverse one gateway in a first one of the networks, and another gateway in the other one of the networks, for example. Gateways may be known as edge nodes.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to determine whether a cryptographic signature of a token received in the apparatus from a network function consumer is valid, obtain a cryptographic signature of the apparatus of the token responsive to the cryptographic signature of the token being valid, and provide the token to a peer entity of the apparatus, wherein the cryptographic signature of the apparatus is either included into the token or provided in a header external to the token, wherein the peer entity is comprised in a second network, different from a first network where the apparatus is comprised in.

According to a second aspect of the present disclosure, there is provided an apparatus comprising at least one processing core, at least one memory including computer program code, the at least one memory and the computer program code being configured to, with the at least one processing core, cause the apparatus at least to determine whether a cryptographic signature of a peer entity of the apparatus applied to a token received in the apparatus from the peer entity is valid, wherein the peer entity is comprised in a first network, different from a second network where the apparatus is comprised in, obtain a cryptographic signature of the apparatus of the token responsive to the cryptographic signature of the peer entity being valid, and provide the token to a node in the second network.

According to a third aspect of the present disclosure, there is provided an apparatus comprising at least one processing core, at least one memory including computer program code, the at least one memory and the computer program code being configured to, with the at least one processing core, cause the apparatus at least to perform as a network function producer or as a network repository function, determine whether a cryptographic signature of a secure edge node applied to a token received in the apparatus from the secure edge node is valid, wherein the secure edge node and the apparatus are comprised in a first network, different from a second network where a network function consumer issuing the token is comprised in, the first network being home network to the network function consumer, and accept a request message which comprises the token responsive to the cryptographic signature of a secure edge node being determined to be valid.

According to a fourth aspect of the present disclosure, there is provided a method comprising determining whether a cryptographic signature of a token received in an apparatus performing the method from a network function consumer is valid, obtaining a cryptographic signature of the apparatus of the token responsive to the cryptographic signature of the token being valid, and providing the token to a peer entity of the apparatus, wherein the cryptographic signature of the apparatus is either included into the token or provided in a header external to the token, wherein the peer entity is comprised in a second network, different from a first network where the apparatus is comprised in.

According to a fifth aspect of the present disclosure, there is provided a method, comprising determining, in an apparatus, whether a cryptographic signature of a peer entity of the apparatus applied to a token received in the apparatus from the peer entity is valid, wherein the peer entity is comprised in a first network, different from a second network where the apparatus is comprised in, obtaining a cryptographic signature of the apparatus of the token responsive to the cryptographic signature of the peer entity being valid, and providing the token to a node in the second network.

According to a sixth aspect of the present disclosure, there is provided a method, comprising performing, by an apparatus, as a network function producer or as a network repository function, determining whether a cryptographic signature of a secure edge node applied to a token received in the apparatus from the secure edge node is valid, wherein the secure edge node and the apparatus are comprised in a first network, different from a second network where a network function consumer issuing the token is comprised in, the first network being home network to the network function consumer, and accepting a request message which comprises the token responsive to the cryptographic signature of a secure edge node being determined to be valid.

According to a seventh aspect of the present disclosure, there is provided an apparatus comprising means for determining whether a cryptographic signature of a token received in the apparatus from a network function consumer is valid, obtaining a cryptographic signature of the apparatus of the token responsive to the cryptographic signature of the token being valid, and providing the token to a peer entity of the apparatus, wherein the cryptographic signature of the apparatus is either included into the token or provided in a header external to the token, wherein the peer entity is comprised in a second network, different from a first network where the apparatus is comprised in.

According to an eighth aspect of the present disclosure, there is provided an apparatus comprising means for determining whether a cryptographic signature of a peer entity of the apparatus applied to a token received in the apparatus from the peer entity is valid, wherein the peer entity is comprised in a first network, different from a second network where the apparatus is comprised in, obtaining a cryptographic signature of the apparatus of the token responsive to the cryptographic signature of the peer entity being valid, and providing the token to a node in the second network.

According to a ninth aspect of the present disclosure, there is provided an apparatus comprising means for performing as a network function producer or as a network repository function, determining whether a cryptographic signature of a secure edge node applied to a token received in the apparatus from the secure edge node is valid, wherein the secure edge node and the apparatus are comprised in a first network, different from a second network where a network function consumer issuing the token is comprised in, the first network being home network to the network function consumer, and accepting a request message which comprises the token responsive to the cryptographic signature of a secure edge node being determined to be valid.

According to a tenth aspect of the present disclosure, there is provided a non-transitory computer readable medium having stored thereon a set of computer readable instructions that, when executed by at least one processor, cause an apparatus to at least determine whether a cryptographic signature of a token received in the apparatus from a network function consumer is valid, obtain a cryptographic signature of the apparatus of the token responsive to the cryptographic signature of the token being valid, and provide the token to a peer entity of the apparatus, wherein the cryptographic signature of the apparatus is either included into the token or provided in a header external to the token, wherein the peer entity is comprised in a second network, different from a first network where the apparatus is comprised in.

According to an eleventh aspect of the present disclosure, there is provided a non-transitory computer readable medium having stored thereon a set of computer readable instructions that, when executed by at least one processor, cause an apparatus to at least determine whether a cryptographic signature of a peer entity of the apparatus applied to a token received in the apparatus from the peer entity is valid, wherein the peer entity is comprised in a first network, different from a second network where the apparatus is comprised in, obtain a cryptographic signature of the apparatus of the token responsive to the cryptographic signature of the peer entity being valid, and provide the token to a node in the second network.

According to a twelfth aspect of the present disclosure, there is provided a non-transitory computer readable medium having stored thereon a set of computer readable instructions that, when executed by at least one processor, cause an apparatus to at least perform as a network function producer or as a network repository function, determine whether a cryptographic signature of a secure edge node applied to a token received in the apparatus from the secure edge node is valid, wherein the secure edge node and the apparatus are comprised in a first network, different from a second network where a network function consumer issuing the token is comprised in, the first network being home network to the network function consumer, and accept a request message which comprises the token responsive to the cryptographic signature of a secure edge node being determined to be valid.

According to a thirteenth aspect of the present disclosure, there is provided a computer program configured to cause an apparatus to perform at least the following, when run: determine whether a cryptographic signature of a token received in the apparatus from a network function consumer is valid, obtain a cryptographic signature of the apparatus of the token responsive to the cryptographic signature of the token being valid, and provide the token to a peer entity of the apparatus, wherein the cryptographic signature of the apparatus is either included into the token or provided in a header external to the token, wherein the peer entity is comprised in a second network, different from a first network where the apparatus is comprised in.

According to a fourteenth aspect of the present disclosure, there is provided a computer program configured to cause an apparatus to perform at least the following, when run: determine whether a cryptographic signature of a peer entity of the apparatus applied to a token received in the apparatus from the peer entity is valid, wherein the peer entity is comprised in a first network, different from a second network where the apparatus is comprised in, obtain a cryptographic signature of the apparatus of the token responsive to the cryptographic signature of the peer entity being valid, and provide the token to a node in the second network.

According to a fifteenth aspect of the present disclosure, there is provided a computer program configured to cause an apparatus to perform at least the following, when run: perform as a network function producer or as a network repository function, determine whether a cryptographic signature of a secure edge node applied to a token received in the apparatus from the secure edge node is valid, wherein the secure edge node and the apparatus are comprised in a first network, different from a second network where a network function consumer issuing the token is comprised in, the first network being home network to the network function consumer, and accept a request message which comprises the token responsive to the cryptographic signature of a secure edge node being determined to be valid.

EMBODIMENTS

In a service based architecture, for example, a network function consumer in a serving network accessed by a roaming user equipment, UE, may send a request to the home network of the UE to obtain service or information. In the absence of a complex public-key infrastructure covering all network function consumer instances in visited networks between the home and visited networks needed with asymmetric key based signatures, or a shared database between the home and visited networks containing a complete set of the shared secrets required for HMAC symmetric key based signatures, the network function consumer's signature would be difficult to verify in the home network. The present disclosure describes methods to enable the signature to be verified based on a trust relationship established between edge nodes connecting the home and visited networks together. The trust relationship may be a result of a certificate exchange performed by the edge nodes when establishing a protocol connection between the edge nodes, for example. An example of such a protocol connection is a transport layer security, TLS, connection or a mutual TLS, mTLS, connection.

Figure 1:
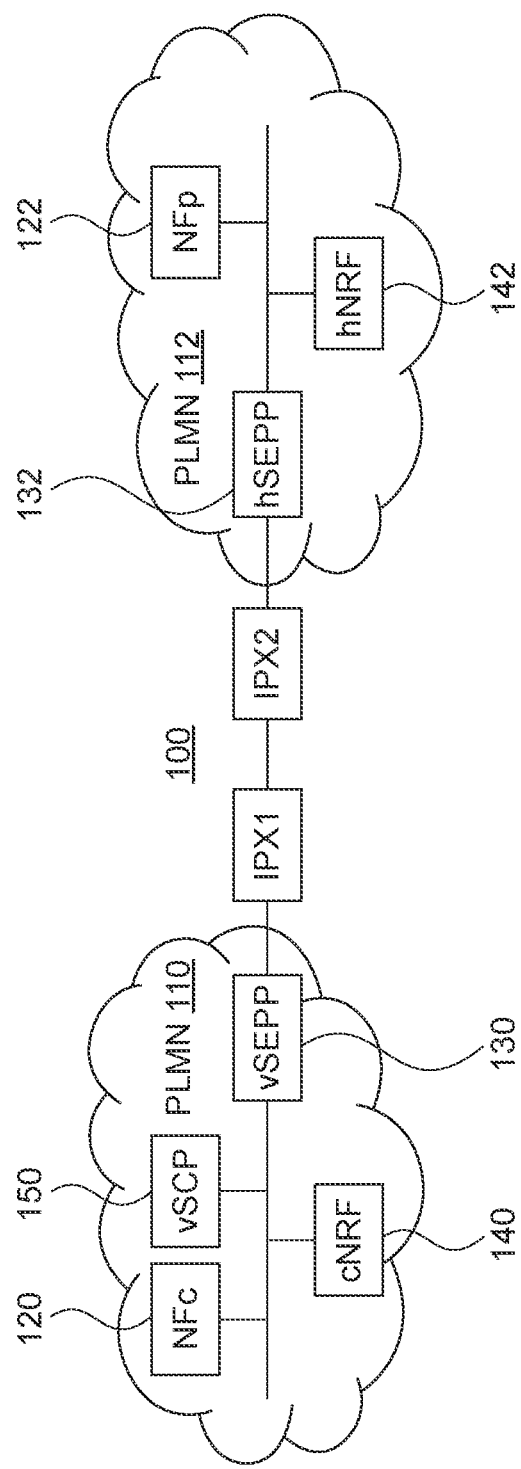
FIG. 1 illustrates an example system in accordance with at least some embodiments of the present invention.

FIG. 1 illustrates an example system in accordance with at least some embodiments of the present invention. The system comprises two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network functions, VNFs, or container-based network functions, CNFs. One physical node may be configured to perform plural NFs. Examples of such network functions include a resource control or management function, session management or control function, interworking, data management or storage function, authentication function or a combination of one or more of these functions.

In case of a third generation partnership project, 3GPP, 5G system service based architecture, SBA, core network, NFs may comprise at least some of an access and mobility management function, AMF, a session management function, SMF, a network slice selection function, NSSF, a network exposure function, NEF, a network repository function, NRF, a unified data management node, UDM, an authentication server function, AUSF, a policy control function, PCF, and an application function, AF. The PLMNs each may further comprise an edge node such as a security edge protection proxy, SEPP, 130, 132 configured to operate as a secure edge node and/or gateway. The NFs may communicate with each other using representational state transfer application programming interfaces, for example. These may be known as Restful APIs. Further examples of NFs include NFs related to gaming, streaming or industrial process control. The system may comprise also nodes from 3G or 4G systems, such as home subscriber server, HSS, and a suitable interworking function for protocol translations between, for example, diameter and REST API JSON. While described herein primarily using terminology of 5G systems, the principles of the invention are applicable also to other communication networks using edge nodes/gateways as described herein, such as non-3GPP networks, for example.

In a two-PLMN case, in FIG. 1, the SEPP 130, 132 is a network node at the boundary of an operator's network that may be configured to receive a message, such as an HTTP request or HTTP response from an NF, to apply protection for sending and to forward the reformatted message towards a receiving SEPP. The forwarding may traverse at least one intermediate node, such as IP eXchange, IPX. The receiving SEPP receives a message sent by the sending SEPP and forwards the message towards an NF within its operator's network, e.g. the AUSF. The SEPP may make additional security validations. An end-to-end protocol connection may be established between SEPPs 130, 132. Such an end-to-end connection may be based on transport layer security, TLS, for example. A TLS version 1.1, version 1.2 or version 1.3 connection may be used, for example. Establishing such a protocol connection may comprise an exchange of certificates between the edge nodes, enabling the edge nodes to verify cryptographic signatures generated by each other. Data of the end-to-end connection may be conveyed by intermediate IPXs, however the role of these IPXs with respect to the end-to-end connection may be merely forwarding where the IPXs do not act on the data of the end-to-end connection. An interface between two SEPPs may be known as a N32 interface, comprising an N32-c control plane and an N32-f data plane. A TLS end-to-end connection may be used to convey information over the N32-c interface, for example. The N32-f payload may comprise javascript object notation, JSON, web encryption, JWE, and JSON web signature, JWS, messages between the SEPPs, for example. The payload may, in some embodiments comprise also JWS protected parts added by IPX nodes.

In the example of FIG. 1, communication takes place between a service-consuming NF and a service-producing NF, henceforth referred to as NFc 120 and NFp 122. They may also be referred to as NF service consumer and NF service producer, respectively. PLMN 112 is the home network of the UE and PLMN 110 the visited network in the example of FIG. 1. NFc 120 in visited network 110.

A service communication proxy, SCP, 150 may be deployed for indirect communication between network functions, NFs, or between NFs and the SEPP. An SCP is an intermediate network entity to assist in indirect communication between an NFc and an NFp, including routing messages, such as, for example, control plane messages between the NFs, and optionally including discovering and selecting NFp on behalf of NFc or requesting an access token from the NRF or an Authorization Server on behalf of NFc to access the service of NFp.

Direct communication may be applied between NFc 120 and NFp 122 for an NF service, or NF service communication may be performed indirectly via SCP(s) 150. In direct communication, the NFc 120 performs discovery of the target NFp 122 by local configuration or via local NRF, cNRF 140. In indirect communication, the NFc 120 may delegate the discovery of the target NFp 122 to at least one SCP. In the latter case, the SCP(s) may use the parameters provided by NFc 120 to perform discovery and/or selection of the target NFp, for example with reference to one or more NRF(s).

NF discovery and NF service discovery enable entities, such as NFc or SCP, to discover a set of NF instance(s) and NF service instance(s) for a specific NF service or an NF type. The NFc and/or the SCP may be core network entities. The network repository function, NRF, may comprise a function that is used to support the functionality of NF and NF service registration, discovery, authorization and status notification. The NRF may maintain an NF profile of available NFp entities and their supported services. The NRF may notify about newly registered, updated, or deregistered NFp entities along with its NF services to a subscribed NFc or SCP. An NRF may thus advise NFc entities concerning where, that is, from which NFp entities, they may obtain services they need. An NRF may be co-located together with an SCP, for example, run in a same computing substrate.

Alternatively, NRF may be in a physically distinct node than an SCP or even hosted by a service provider.

In order for the NFc 120 or SCP 150 to obtain information about the NFp and/or NF service(s) registered or configured in a PLMN/slice, the NFc 120 or SCP 150 may initiate, based on local configuration, a discovery procedure with an NRF, such as cNRF 140. The discovery procedure may be initiated by providing the type of the NF and optionally a list of the specific service(s) it is attempting to discover. The NFc 120 or SCP 150 may also provide other service parameters, such as information relating to network slicing.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

NFc 120 may be configured to include a cryptographic token into requests it sends to nodes in the home network, PLMN 112. The cryptographic token may comprise, for example, a client credentials assertion, CCA, token including an identifier of NFc 120, for example a NF instance ID. Further, the token may comprise a timestamp to indicate when the cryptographic token was created and signed, and an expiration time to provide a basis for restricting a lifetime of the token. Further, the token may comprise a network function type of an expected audience of a request comprising the token. Examples of such NF types include cNRF and NFp. Further, the token comprises a cryptographic signature, which will be referred to herein as a signature for the sake of brevity. A signature may be generated using a private key of a public key-private key pair of an asymmetric public key cryptosystem, such as RSA or ElGamal, for example, or using shared secrets (for example, HMAC based) with symmetric key cryptosystem. The signature may be verified using the public key, which may be openly distributed, for example in public-key certificates (for asymmetric public key cryptosystems) or by using shared secrets (for symmetric key cryptosystems) distributed using a secure channel or another mechanism (for example, by using a shared secrets database provisioned out-of-band). The signature may be obtained over the contents of the token, or over a part of the contents of the token. The signed token may include a field indicating a X.509 uniform resource locator, URL, referring to a resource for a public key certificate or certificate chain used in signing the token. Alternatively, the field may indicate a certificate chain, the chain including, for example, a X.509 public key certificate used for signing the token. The X.509 URL and/or the X.509 certificate chain indication may collectively be referred to as X.509 information. The signature may be generated as described in Internet Engineering Task Force, IETF, request for comments, RFC 7515. In some embodiments, the token includes a target PLMN identifier. X.509 information is applicable when an asymmetric cryptosystem is used. A key-id field, "kid", may be used alternatively to X.509 information, for example in case a symmetric cryptosystem is used. The key-id field may identify a key usable in verifying the signature.

When using the indirect communication option, the roaming scenario of FIG. 1 presents a difficulty as the signature on the token originating in the visited network may be difficult to verify in the home network. This is particularly the case, if no public-key infrastructure is established between the home and visited networks. It is also particularly so in case symmetric-encryption signatures are used, as distributing a large number of secret key securely is a difficult challenge. In the present text, the inter-domain service based architecture, SBA, with asymmetric key based cryptosystems will be described. However, depending on the embodiment, we can use different JWS solutions and even different "alg" header parameters for defining the algorithm used for signing the token by NFc and/or vSEPP. The number of hops, such as TLS hops, for example, from node to node is high, particularly when roaming and using indirect communication. This makes it desirable, and challenging, to have a dependable end-to-end solution for signature verification. As the public key corresponding to the private key used to generate the signature is not available, verification of the signature cannot take place. In the indirect communication option, a visited SCP, vSCP 150 may participate in the communication path of the request in the visited network, and/or a home SCP may participate in the communication path of the request in the home network. The request may be a request for discovery, for an access token or for a service from a NFp, for example. A service request may be a Nnf service request.

To enable verification of the signature in the token in the home network, it is herein suggested that the SEPPs in the visited and home networks, respectively, establish a trust relationship, for example by exchanging public-key certificates (for example, public-key certificates sharing via N32-c. Using other, out-of-band mechanisms or establishing a specific HTTPS based retrieval service in association with the X.509 information is also possible). This exchange may take place in connection with establishing the protocol connection between the SEPPs, or edge nodes in more generic terms. The exchange may take place in connection with establishing a N32 connection between the edge nodes. As noted above, this may comprise establishment of a TLS or mTLS connection. The shared certificates establish a trust relationship between the SEPPs, enabling verification of the signature as will be described herein.

NFc 120 may compose the request in the visited network 110, the request comprising the token, the token comprising the signature, as described herein above. The request is sent in the indirect-communication case to vSCP 150, and from there to the visited SEPP 130, or vSEPP 130 in brief.

Since the vSEPP 130 is in visited network 110, it can verify the signature in the token since it can access the public key corresponding to the private key used to generate the signature. For example, vSEPP 130 may retrieve a certificate comprising the public key, for example based on the X.509 information in the token or the key-id in the token or in the request outside the token. There may exist a central distribution point, under the same authoritative domain with the originating NFc 120 and vSEPP 130, where all the intra-domain SBA X.509 public key certificates for validating token signatures are shared. In the event the signature is verified by vSEPP 130 as correct, vSEPP 130 may obtain a cryptographic signature of the vSEPP 130 over the token. This may involve using a private key of the vSEPP 130 that vSEPP 130 knows home SEPP 132, or hSEPP 132 in brief, in the home network has the corresponding public key, for example based on a prior certificate exchange between the SEPPs. Alternatively, vSEPP 130 may know that hSEPP 132 is able to retrieve the corresponding public key even if hSEPP 132 may not currently possess this public key. vSEPP 130 may include the signature it generated into the request, in detail, vSEPP 130 may include it into the token itself, or in a header field of the request which is in the request but external to the token. Inclusion of the signature in the request changes the original request into a modified request by adding headers, for example.

In case the vSEPP 130 includes the signature into the token, vSEPP 130 may modify the X.509 information of the token to identify the certificate of vSEPP 130 enabled to verify the signature of SEPP 130. If a different algorithm is used for signing, also an "alg" parameter may be changed. Likewise, vSEPP 130 may replace the signature of NFc 120 with its own signature in the token. When replacing its own signature into the token, vSEPP 130 may obtain this signature from the token after replacing its own X.509 information into the token to replace the X.509 information of the NFc. In case vSEPP 130 includes the signature into the header, vSEPP 130 may also include its X.509 information in a header of the request. The header may be a 3GPP header, for example. The signature and the X.509 information may be in separate headers.

vSEPP 130 of the visited NW may then send the modified request, with added headers or amended token, to hSEPP 132 in the home network. Initial discovery requests and the subsequent service requests may be routed via different visited vSEPP and/or home hSEPP nodes.

In case X.509 URL is used with the signature of vSEPP 130 included into the token, the domain part of the X.509 URL in the token newly signed by vSEPP 130 needs to be trusted by the target hSEPP 132 that needs to validate the new signature in the modified request using the X.509 public key certificate or certificate chain. Additionally, there may exist a central distribution point under the same authoritative domain with the vSEPP which is trusted by the hSEPP where all the inter-domain X.509 public key certificates for validating the token signatures are shared. In case the central distribution point is used, the location URL and certificate downloadable via this central distribution point may be referenced explicitly with "x5u" type X.509 information or indirectly via key-id.

Responsive to receiving the request from vSEPP 130, hSEPP 132 verifies the signature generated by vSEPP 130. It is enabled to do so as it has, or can obtain, the public key corresponding to the private key used to generate the signature. In detail, it may use the X.509 information in the token, or a header of the request, to identify the correct public key to use. Since vSEPP 130 and hSEPP 132 have already established a protocol connection, they trust and verify each other certificates. The trust may come either by certificate chain of trusts between two roaming partners or by other means.

Responsive to the signature being verified as correct, the hSEPP 132 performs actions as did the vSEPP 130. In detail, it generates a signature of the token using its own private key, and includes it in the request, in the token or in a separate header of the request, along with X.509 information enabling identification of the public key corresponding to the private key used by hSEPP 132 in generating the signature over the token. The separate header(s) may be 3GPP header(s), for example.

In case hSEPP 132 includes its signature into the token, hSEPP 132 may modify the X.509 information of the token to identify the public key certificate of hSEPP 132 enabled to verify the signature of hSEPP 132. Likewise, hSEPP 132 may replace the signature of NFc 120 or vSEPP 130 with its own signature in the token. Including its signature may be interpreted as an action indicating the vSEPP/hSEPP has validated the signature previously in the request. In case hSEPP 132 includes the signature into the header, hSEPP 132 may also include its X.509 information in a header of the request. The header may be a 3GPP header, for example.

Once hSEPP 132 has included its signature and, in some embodiments, the X.509 information, in the request, it may forward the thus modified request, with added/amended header(s) or amended token, onward to home SCP (in the indirect-communication case), which forwards it onward to NFp 122 or home NRF, hNRF 142, depending on the nature of the request.

Since hSEPP 132 and NFp 122 (or hNRF 142) belong to the same network, they can act on the X.509 information of each other. Therefore, NFp 122, for example, with the help of X.509 PKI information provided in the request can obtain the public key of hSEPP 132, and verify the (latest) signature of the request. The token is therefore verified at the end node, NFp or hNRF, based on a chain of trust from the vSEPP to the hSEPP, and to the end node itself.

In case the X.509 URL is included in the token itself, the domain part of the X.509 URL in the newly signed token by hSEPP 132 needs to be trusted by the end node that needs to validate the signature of the signed token using the X.509 public key certificate or certificate chain for the token. Additionally or alternatively, there may exist a central distribution point under the same authoritative domain with the home hSEPP 132 and the end node where all the intra-domain SBA X.509 public key certificates for validating the token signatures are shared.

Responsive to successfully verifying the signature, the end node may respond back to the NFc 120 in the visited network with a deliverable requested in the request. In the event a signature is not verified as correct in either SEPP or the end node, the request may be discarded, or an error message may be returned to NFc 120.

When the signatures are included, not in the token itself but in the separate header, there is no need to modify the original token received from NFc 120, but headers, such as 3GPP headers, may be defined in the request in order to share the X.509 information and the signature. The original token is shared among the involved nodes, but the additional information of signature and X.509 information is shared using the headers. Thus, in this case the X.509 information, such as public key certificate or certificate chain information, present in the original token sent by NFc 120, can neither be verified by the home hSEPP 132, NFp 120 nor hNRF 142. The token can be verified via the information provided in the headers. Additionally, in general as a technical effect and benefit there is no need for any central distribution point under the same authoritative domain with the originating NFc 120 and vSEPP 130 visible to hSEPP 132 or the end node for the X.509 public key certificates for validating the CCA signatures.

While discussed here in terms of X.509 certificates and X.509 information, the invention is not limited thereto and may be worked using other certificate standards as well.

Figure 2A:
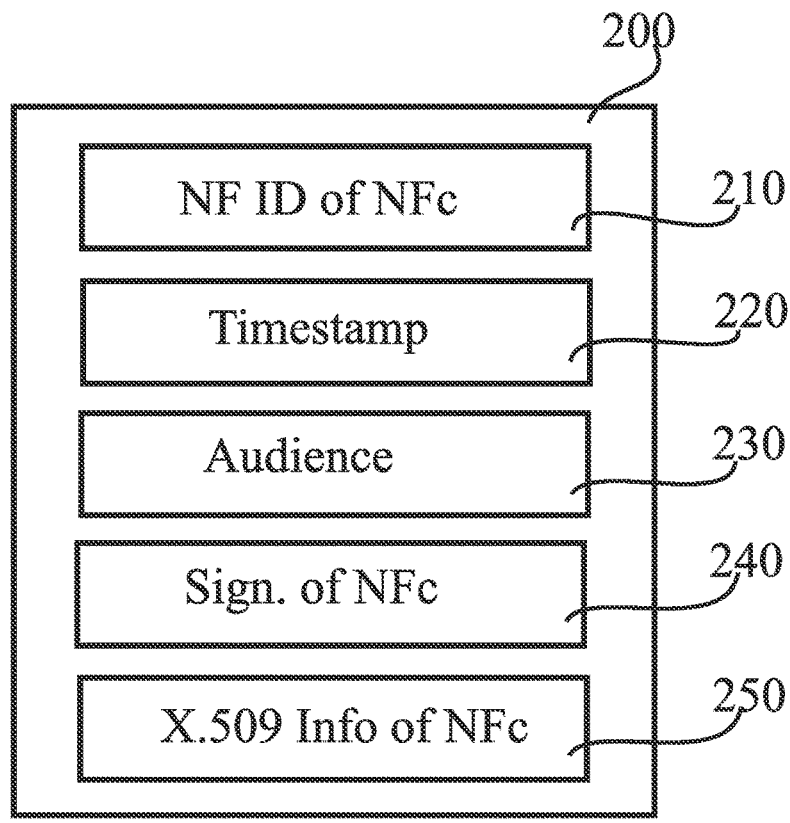
FIG. 2A illustrates an example token issued by a network function consumer in accordance with at least some embodiments of the present invention.

FIG. 2A illustrates an example token issued by a network function consumer in accordance with at least some embodiments of the present invention.

The token 200, such as a CCA, includes a NF identity of the issuing node 210. The issuing node may be the NFc 120, as discussed above. The token of FIG. 2A further comprises timestamp 220 and the intended audience indicator 230, as discussed herein above. Token 200 may, optionally, further comprise a Target PLMN identifier. The signature 240 is obtained over the contents of the token (excluding the signature itself) by the issuing node NFc 120 using a private key of NFc 120. X.509 information 240 indicates how the public key corresponding to the private key used to generate the signature can be obtained, as discussed herein above.

Figure 2B:
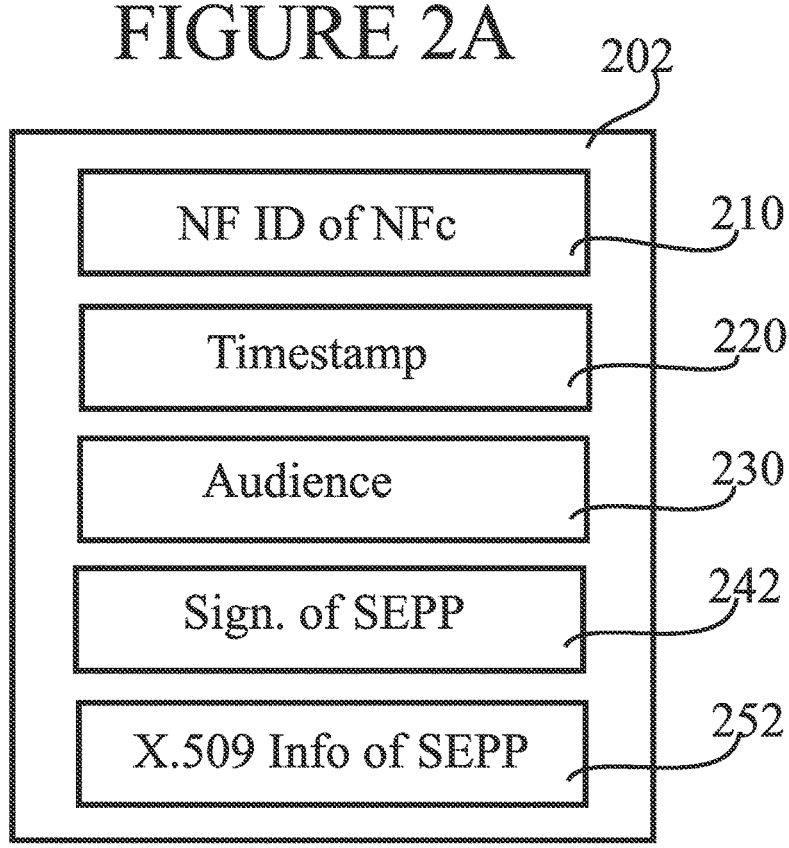
FIG. 2B illustrates an example token as modified by an edge node in accordance with at least some embodiments of the present invention.

FIG. 2B illustrates an example token as modified by an edge node in accordance with at least some embodiments of the present invention.

The token 202 corresponds to the token 200 of FIG. 2A, with the exception that the edge node, e.g. SEPP, has modified the token by replacing the signature 240 obtained by the NFc with a signature 242 obtained by the SEPP itself, using a private key of the SEPP. Further, the SEPP has replaced the X.509 information of the NFc 250 with X.509 information 252 of the SEPP itself. The X.509 information 252 of the SEPP indicates how to obtain the public key of the SEPP, needed to verify the signature 242 of the SEPP.

Figure 3:
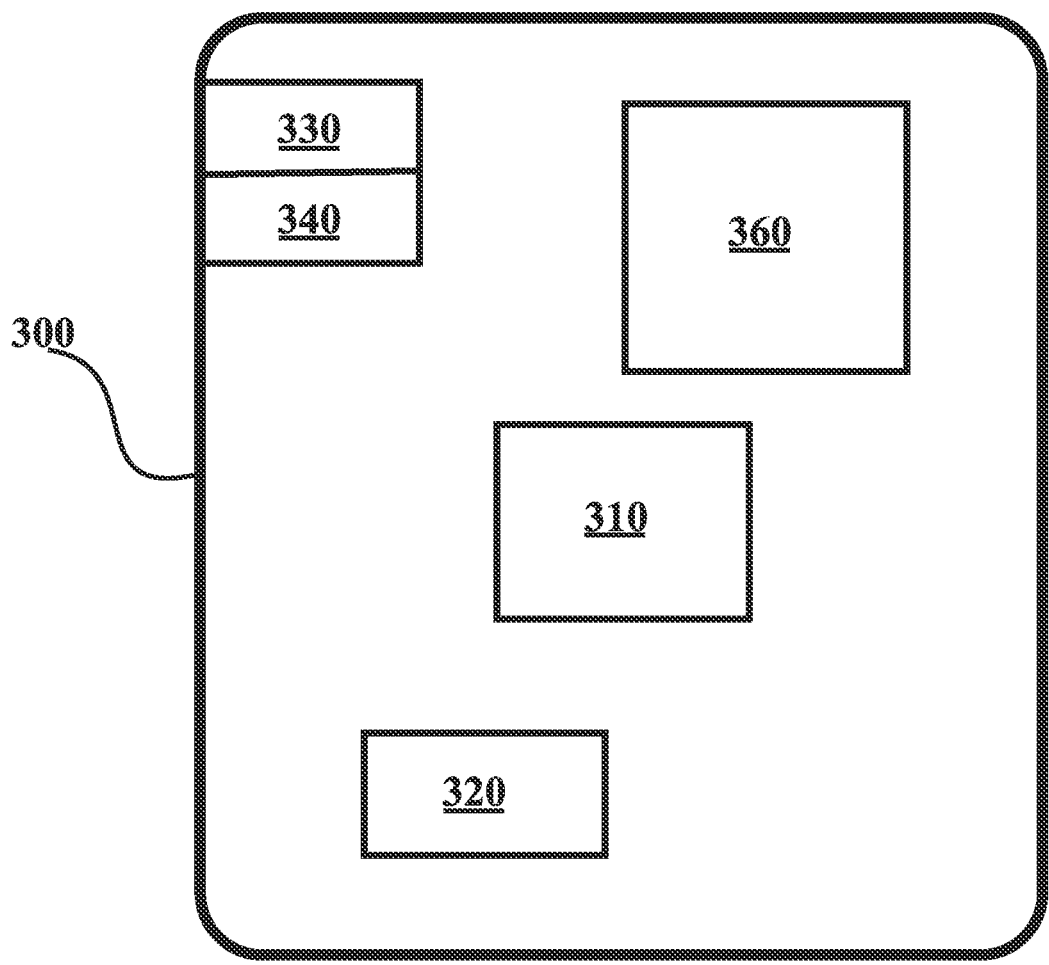
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, SEPP or NFp FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as determining, obtaining, providing, performing and accepting. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker or a microphone. A user may be able to operate device 300 via UI 360, for example to configure security parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
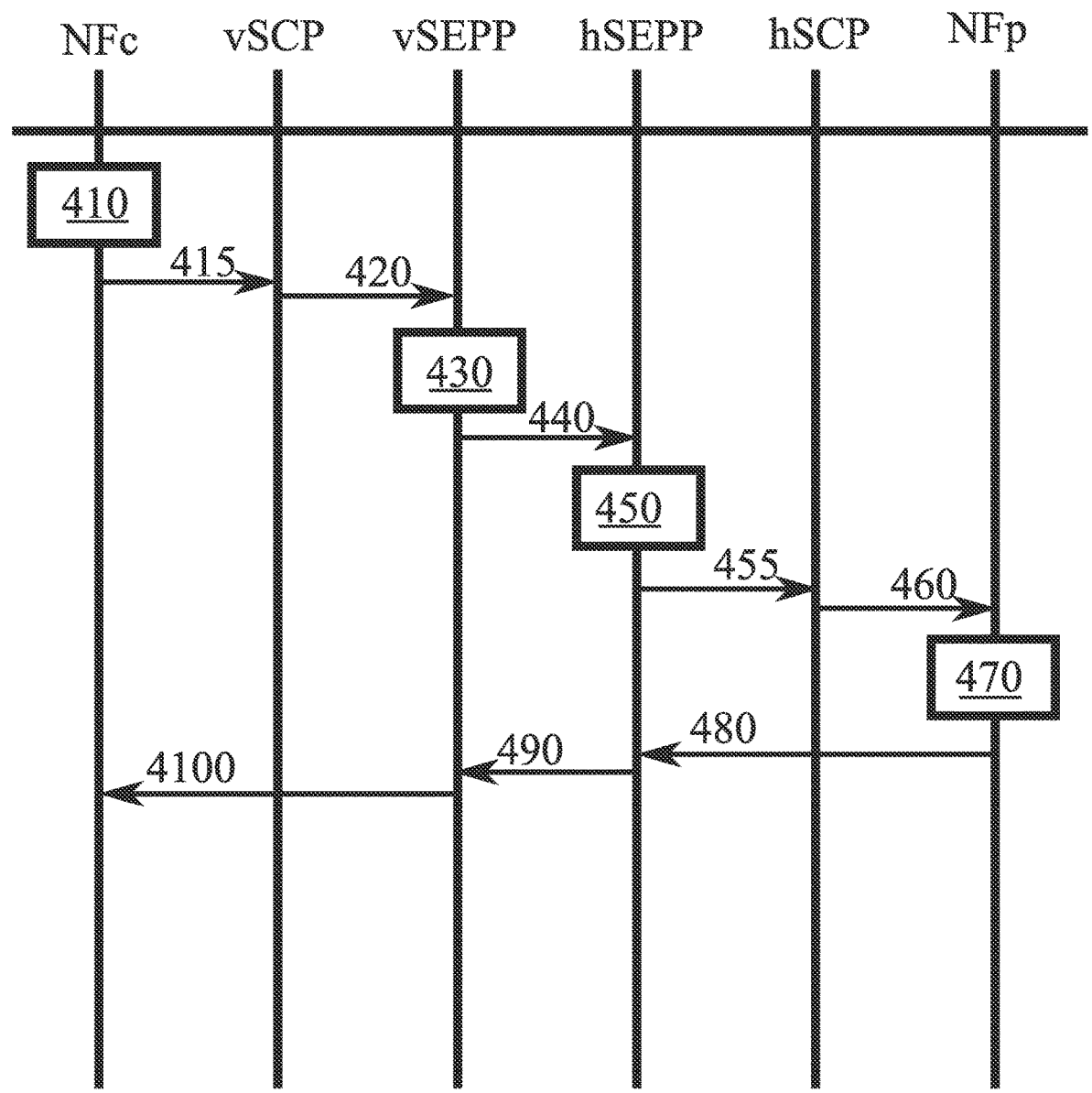
FIG. 4 illustrates signalling in accordance with at least some embodiments of the present invention.

FIG. 4 illustrates signalling in accordance with at least some embodiments of the present invention. On the vertical axes are disposed, from the left to the right in terms of FIG. 1, NFc 120, vSCP 150, vSEPP 130, hSEPP 132, home SCP hSCP and NFp 122. Time advances from the top toward the bottom.

In phase 410, NFc 120 generates a token, such as a CCA. In phases 415 and 420, a request comprising the token is sent to the vSEPP 130. Responsively, in phase 430, the vSEPP 130 verifies the signature in the token comprised in the request. In case the signature is correct, the vSEPP 130 obtains a new signature of the token, using its own private key, and includes the new signature in the request, either to replace the signature of NFc 120 in the token itself, or in a separate header field of the request message, as described above. vSEPP 130 may also include its X.509 information in the request, either to replace the x.509 information of NFc 120 in the token itself, or in a separate header, as described above. Thus a modified request is obtained, the modified request having additional header(s) and/or an amended token.

In phase 440, the vSEPP 130 provides the modified request, with the header(s) and/or the amended token, to hSEPP 132. In phase 450, the hSEPP verifies the signature of vSEPP in the request, and responsive to determining the signature is correct, the hSEPP inserts its own signature of the token into the request, either to replace the existing signature in the token, or into the separate header in the request message. Likewise, hSEPP 132 may include its X.509 information into the token to replace the X.509 existing in the token, or into a separate header. hSEPP 132 may obtain its signature of the token after replacing its own X.509 information into the token.

In phases 455 and 460, the hSEPP 132 sends the twice-modified request, with the header(s) and/or the amended token, via the home SCP to the NFp. In phase 470, the NFp verifies the signature of hSEPP 132 in the request. In some embodiments, in phase 470, NFp (in hPLMN) may find mapping between the authenticated identity of the NFc in vPLMN, that is "NF ID of NFc 210" in the token and the identify in an OAuth2.0 JWT access token in "sub" (Subject) claim; similarly, NRF in hPLMN may be able to compare the (secure/validated) identity of the NFc in AccessTokenReq (to hNRF via vNRF) matching with the authenticated identity of the NFc (in vPLMN) with "NF ID of NFc 210" in the token.

Responsive to the signature being successfully verified, the NFp can trust the token is issued by NFc, and responsively the NFp may provide the requested deliverable in one or more messages to NFp 120 via hSEPP 132 and vSEPP 130, phases 480, 490 and 4100. In some embodiments, also the deliverable(s) is(are) delivered via home SCP and vSCP 150.

Figure 5:
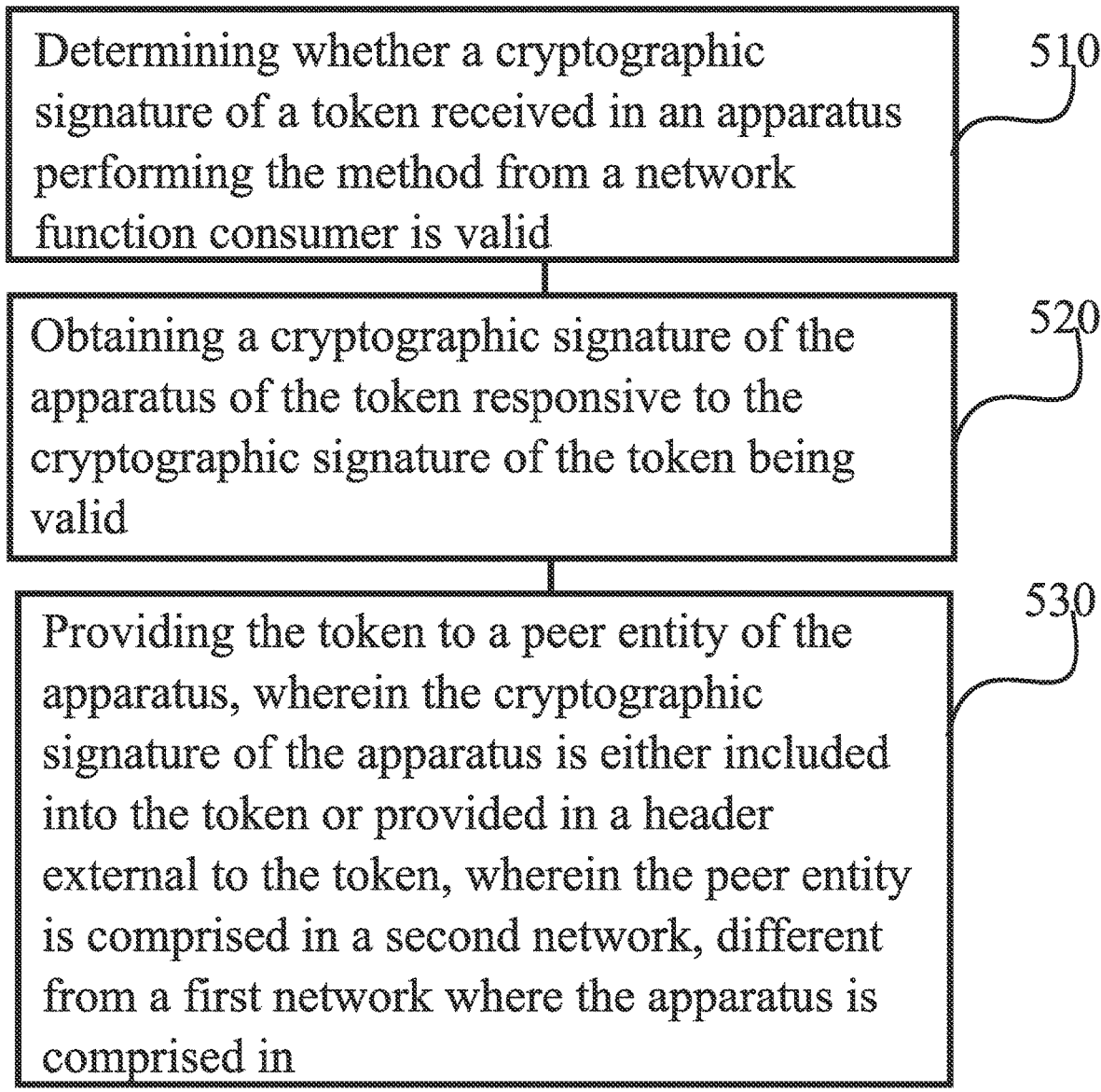
FIG. 5 is a flow graph of a method in accordance with at least some embodiments of the present invention.

FIG. 5 is a flow graph of a method in accordance with at least some embodiments of the present invention. The phases of the illustrated method may be performed in the visited-network SEPP 130, or in a control device configured to control the functioning thereof, when installed therein.

Phase 510 comprises determining whether a cryptographic signature of a token received in an apparatus performing the method from a network function consumer is valid. Phase 520 comprises obtaining a cryptographic signature of the apparatus of the token responsive to the cryptographic signature of the token being valid. Finally, phase 530 comprises providing the token to a peer entity of the apparatus, wherein the cryptographic signature of the apparatus is either included into the token or provided in a header external to the token, wherein the peer entity is comprised in a second network, different from a first network where the apparatus is comprised in.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing security in network inter-operation.

The invention claimed is:

1. An apparatus comprising at least one processor; and at least one memory including computer program code; the at least one memory and the computer program code configured to, with the at least one processor, cause the apparatus at least to:
   determine whether a cryptographic signature of a token received in the apparatus from a network function consumer is valid upon accepting a request which comprises the token responsive to a cryptographic signature of an edge node being determined to be valid at a first network being a home network to the network function consumer,
   said token comprises a client credentials assertion, a network function instance identifier, a timestamp to indicate when the token was created and signed, an expiration time to provide a basis for restricting a lifetime of the token, a network function type of an expected audience of the request comprising the token, an X.509 information field indicating an X.509 uniform resource locator (URL) referring to a resource for a public key certificate or certificate chain used in signing the token, and a target Public Land Mobile Network (PLMN) identifier,
   wherein the cryptographic signature is generated using a private key of a public key-private key pair of an asymmetric public key cryptosystem or using shared secrets with symmetric key cryptosystem;
   obtain a cryptographic signature of the apparatus of the token responsive to the cryptographic signature of the token being valid by leveraging a trust relationship established between edge nodes connecting the home network and visited networks together,
   said trust relationship is a result of a certificate exchange performed by the edge nodes when establishing a protocol connection between the edge nodes by using transport layer security (TLS) connection or a mutual TLS (mTLS) connection, and
   said certificate exchange is performed by modifying the token by replacing the cryptographic signature of the network function consumer with the cryptographic signature of the edge node in the first network and replacing the X.509 information of the network function consumer with the X.509 information of the edge node in the first network,
   wherein the X.509 information of the edge node in the first network indicates how to obtain a public key needed to verify the cryptographic signature; and
   provide the token to a peer entity of the apparatus and the cryptographic signature of the apparatus is either included into the token or provided in a header external to the token, wherein the peer entity is comprised in a second network, different from the first network where the apparatus is comprised in.

2. The apparatus according to claim 1, wherein the second network is a home network of a user equipment the network function consumer serves with the request.

3. The apparatus according to claim 2, wherein the token comprises a javascript object notation web token.

4. The apparatus according to claim 2, wherein the apparatus is further configured to establish the trust relationship based on the protocol connection with the peer entity before receiving the token from the network function consumer.

5. The apparatus according to claim 1, wherein the apparatus is further configured to receive the token comprised in a request addressed to a node in the second network.

6. The apparatus according to claim 5, wherein the request comprises an access token request, a discovery request or a service request.

7. The apparatus according to claim 6, wherein the apparatus is configured to perform as a secure edge protection proxy as defined by third generation partnership project.

8. An apparatus comprising at least one processor; and at least one memory including computer program code; the at least one memory and the computer program code configured to, with the at least one processor, cause the apparatus at least to:
   determine whether a cryptographic signature of a peer entity of the apparatus applied to a token received in the apparatus from the peer entity is valid upon accepting a request which comprises the token responsive to a cryptographic signature of an edge node being determined to be valid at a second network being a home network to a network function consumer,
   said token comprises a client credentials assertion, a network function instance identifier, a timestamp to indicate when the token was created and signed, an expiration time to provide a basis for restricting a lifetime of the token, a network function type of an expected audience of the request comprising the token, an X.509 information field indicating an X.509 uniform resource locator (URL) referring to a resource for a public key certificate or certificate chain used in signing the token and a target Public Land Mobile Network (PLMN) identifier,
   wherein the cryptographic signature is generated using a private key of a public key-private key pair of an asymmetric public key cryptosystem or using shared secrets with symmetric key cryptosystem,
   wherein the peer entity is comprised in a first network, different from the second network where the apparatus is comprised in;
   obtain a cryptographic signature of the apparatus of the token responsive to the cryptographic signature of the peer entity being valid by leveraging a trust relationship established between edge nodes connecting the home network and visited networks together,
   said trust relationship is a result of a certificate exchange performed by the edge nodes when establishing a protocol connection between the edge nodes by using transport layer security (TLS) connection or a mutual TLS (mTLS) connection, and
   said certificate exchange is performed by modifying the token by replacing the cryptographic signature of the network function consumer with the cryptographic signature of the edge node in the first network and replacing the X.509 information of the network function consumer with the X.509 information of the edge node in the first network, wherein the X.509 information of the edge node in the first network indicates how to obtain a public key needed to verify the cryptographic signature; and provide the token to a node in the second network.

9. The apparatus according to claim 8, wherein the token comprises a javascript object notation web token.

10. The apparatus according to claim 8, wherein the apparatus is further configured to cause the apparatus to establish the trust relationship based on the protocol connection with the peer entity before receiving the token from the peer entity.

11. The apparatus according to claim 10, wherein the apparatus is further configured to determine whether the cryptographic signature of the peer entity is valid based at least partly on the trust relationship.

12. A method comprising:
   determining whether a cryptographic signature of a token received in an apparatus performing the method from a network function consumer is valid upon accepting a request which comprises the token responsive to a cryptographic signature of an edge node being determined to be valid at a first network being a home network to the network function consumer,
   said token comprises a client credentials assertion, a network function instance identifier, a timestamp to indicate when the token was created and signed, an expiration time to provide a basis for restricting a lifetime of the token, a network function type of an expected audience of the request comprising the token, an X.509 information field indicating an X.509 uniform resource locator (URL) referring to a resource for a public key certificate or certificate chain used in signing the token and a target Public Land Mobile Network (PLMN) identifier,
   wherein the cryptographic signature is generated using a private key of a public key-private key pair of an asymmetric public key cryptosystem or using shared secrets with symmetric key cryptosystem;
   obtaining a cryptographic signature of the apparatus of the token responsive to the cryptographic signature of the token being valid by leveraging a trust relationship established between edge nodes connecting the home network and visited networks together,
   said trust relationship is a result of a certificate exchange performed by the edge nodes when establishing a protocol connection between the edge nodes by using transport layer security (TLS) connection or a mutual TLS (mTLS) connection,
   said certificate exchange is performed by modifying the token by replacing the cryptographic signature of the network function consumer with the cryptographic signature of the edge node in the first network and replacing the X.509 information of the network function consumer with the X.509 information of the edge node in the first network,
   wherein the X.509 information of the edge node in the first network indicates how to obtain a public key needed to verify the cryptographic signature; and
   providing the token to a peer entity of the apparatus and the cryptographic signature of the apparatus is either included into the token or provided in a header external to the token, wherein the peer entity is comprised in a second network, different from the first network where the apparatus is comprised in.

13. The method according to claim 12, wherein the second network is a home network of a user equipment the network function consumer serves with the request.

14. The method according to claim 13, wherein the token comprises a javascript object notation web token.

15. The method according to claim 13, further comprising establishing the trust relationship based on the protocol connection between the apparatus and the peer entity before receiving the token from the network function consumer.

16. The method according to claim 12, wherein the token is received in the apparatus comprised in a request addressed to a node in the second network.

17. The method according to claim 16, wherein the request comprises an access token request, a discovery request or a service request.

* * * * *